(12) United States Patent
Feick

(10) Patent No.: US 7,703,188 B2
(45) Date of Patent: Apr. 27, 2010

(54) THERMAL SHROUD AND METHOD OF MAKING SAME

(75) Inventor: Murray Feick, Kitchener (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 383 days.

(21) Appl. No.: 11/435,969

(22) Filed: May 17, 2006

(65) Prior Publication Data

US 2006/0263469 A1   Nov. 23, 2006

Related U.S. Application Data

(60) Provisional application No. 60/682,394, filed on May 19, 2005.

(51) Int. Cl.
B23P 17/00 (2006.01)
B29C 45/00 (2006.01)

(52) U.S. Cl. .................... 29/421.1; 29/446; 264/328.15

(58) Field of Classification Search ............... 29/421.1, 29/428, 446, 508, 516; 425/549; 264/328.15
See application file for complete search history.

(56) References Cited

U.S. PATENT DOCUMENTS

| | | | |
|---|---|---|---|
| 2,088,586 A | 8/1937 | Cole et al. | |
| 2,522,365 A | 9/1950 | Greene | |
| 2,875,312 A | 2/1959 | Norton | |
| 2,987,300 A | 6/1961 | Greene | |
| 3,677,682 A | 7/1972 | Putkowski | |
| 3,822,856 A | 7/1974 | Gellert | |
| 3,849,630 A | 11/1974 | Halliday | |
| 3,001,017 A | 7/1981 | Stegmeier | |
| 4,327,471 A * | 5/1982 | Whitted, III | ............... 29/421.2 |
| 4,386,262 A | 5/1983 | Gellert | |
| 4,403,405 A | 9/1983 | Gellert | |
| 4,557,685 A | 12/1985 | Gellert | |
| 4,635,851 A | 1/1987 | Zecman | |
| 4,644,140 A | 2/1987 | Hillinger | |
| 4,761,982 A | 8/1988 | Snyder | |
| 4,771,164 A | 9/1988 | Gellert | |
| 4,787,836 A * | 11/1988 | Osuna-Diaz et al. | ......... 425/190 |
| 4,841,836 A * | 6/1989 | Bundy | ......................... 89/14.1 |
| 4,911,636 A * | 3/1990 | Gellert | ....................... 425/549 |
| 5,051,086 A | 9/1991 | Gellert | |

(Continued)

FOREIGN PATENT DOCUMENTS

DE   3046471   7/1982

(Continued)

OTHER PUBLICATIONS

Mold-Masters Ltd., MIM Dura Femto-Shot, Spec Sheets 04.01.01-04.01.05, Jun. 2000.

(Continued)

*Primary Examiner*—Essama Omgba
(74) *Attorney, Agent, or Firm*—Medler Ferro PLLC

(57) ABSTRACT

An injection molding hot runner nozzle and a method of making such a nozzle are disclosed that improves heat transfer along the length of the nozzle. The nozzle includes a nozzle body and a heating element located on an outer surface of the nozzle body having a form-fitting thermally conductive shroud that conforms to a profile of the nozzle and the heating element.

14 Claims, 10 Drawing Sheets

U.S. PATENT DOCUMENTS

| | | | |
|---|---|---|---|
| 5,226,596 A | | 7/1993 | Okamura |
| 5,268,184 A | * | 12/1993 | Gellert ................ 425/190 |
| 5,324,190 A | * | 6/1994 | Frei .................... 425/549 |
| 5,360,333 A | | 11/1994 | Schmidt |
| 5,411,392 A | | 5/1995 | Von Buren |
| 5,507,636 A | | 4/1996 | Gellert |
| 5,591,367 A | * | 1/1997 | Schwarzkopf ......... 219/535 |
| 5,759,595 A | | 6/1998 | Gunther |
| 5,955,120 A | * | 9/1999 | Deissler ............... 425/547 |
| 6,009,616 A | * | 1/2000 | Gellert ................... 29/611 |
| 6,163,016 A | | 12/2000 | Johnson et al. |
| 6,222,165 B1 | | 4/2001 | Schwarzkopf |
| 6,261,083 B1 | | 7/2001 | Stern |
| 6,266,986 B1 | | 7/2001 | Morita et al. |
| 6,394,784 B1 | * | 5/2002 | Gellert et al. ......... 425/549 |
| 6,717,118 B2 | * | 4/2004 | Pilavdzic et al. ....... 219/601 |
| 7,041,944 B2 | * | 5/2006 | Pilavdzic et al. ....... 219/601 |
| 7,137,806 B2 | * | 11/2006 | Babin et al. ........... 425/549 |
| 7,182,591 B2 | * | 2/2007 | Babin .................... 425/568 |
| 7,223,092 B2 | * | 5/2007 | Fischer et al. ......... 425/549 |
| 7,344,372 B2 | * | 3/2008 | Fairy .................... 425/549 |
| 7,381,050 B2 | * | 6/2008 | Fairy .................... 425/549 |
| 7,396,226 B2 | * | 7/2008 | Fairy .................... 425/549 |
| 7,413,432 B2 | * | 8/2008 | Gellert et al. ......... 425/549 |
| 7,462,030 B2 | * | 12/2008 | Fischer et al. ......... 425/549 |
| 2003/0124215 A1 | | 7/2003 | Sattler et al. |
| 2004/0071814 A1 | | 4/2004 | Babin et al. |
| 2005/0145616 A1 | | 7/2005 | Ptasienski et al. |

FOREIGN PATENT DOCUMENTS

| | | |
|---|---|---|
| DE | 4404894 | 1/1995 |
| DE | 19522716 | 9/1996 |
| DE | 29800458 | 3/1998 |
| DE | 29918251 | 12/1999 |
| DE | 20109413 | 9/2001 |
| DE | 20118050 | 2/2002 |
| EP | 0 594 933 | 4/1994 |
| EP | 0 443 203 | 8/1994 |
| EP | 0853513 | 8/2001 |
| EP | 1395085 | 3/2004 |
| FR | 2497477 | 7/1982 |
| JP | 7323442 | 12/1995 |
| KR | 9602976 | 3/1996 |
| WO | 2004/067255 | 8/2004 |

OTHER PUBLICATIONS

Strack Normalien, Heated Nozzles Brochure, p. 7 B 19, Oct. 1999.
EP Appl. No. 06009770.6, European Search Report, Sep. 12, 2006.

* cited by examiner

THERMAL SHROUD AND METHOD OF MAKING SAME

CROSS-REFERENCE TO RELATED APPLICATION

This application claims the benefit of U.S. Provisional Application No. 60/682,394, filed May 19, 2005, which is incorporated by reference herein in its entirety.

FIELD OF THE INVENTION

The invention relates to injection molding, and particularly to a thermal shroud for an injection molding hot runner nozzle.

BACKGROUND OF THE INVENTION

Hot runner nozzles often have an uneven distribution of heat along the length of the melt channel when operating in an injection molding apparatus. The nozzles are generally housed in an opening in a mold plate between a manifold and a mold cavity. The mold plate is typically cold, particularly near the manifold and the mold cavity. As a result, a nozzle head portion and the area around a nozzle tip tend to lose more heat through direct contact with the mold than the nozzle mid-section, which does not contact any part of the mold plate. The uneven distribution of heat along the nozzle causes the temperature of the melt flowing through the nozzle to vary as it travels toward the mold cavity. Any variation in melt temperature can adversely affect the quality of the molded products and is therefore undesirable.

A further disadvantage of an uneven temperature distribution along the length of the nozzle is that the nozzle is subjected to high stress due to the continuous cycling between higher and lower temperatures. This can result in a shorter nozzle life.

With the increased use of plastic materials that are more sensitive to fluctuations in temperature, the melt must be maintained within more accurate and controllable temperature ranges. If the temperature rises too high, to compensate for the heat loss through the contact with the mold, degradation of the melt will result; and if the temperature drops too low, the melt will clog in the system and produce an unacceptable product. Both extremes can necessitate the injection molding apparatus being shut down for a clean-out, which can be a very costly procedure due to the loss of production time.

Thermal sleeves have been used in attempts to reduce the uneven temperature distribution of injection molding hot runner nozzles. A sleeve of material that has a thermal conductivity greater than the material of the nozzle body is slid over the nozzle body and heater. Heater elements often have a circular or elliptical cross-section. Where such a heater is wound around the nozzle body and partially inserted in a groove, the sleeve only contacts the heater element and the contact with the heater element is only tangential. The tangential contact of the sleeve and heater element results in inefficient conduction between the components. Where the heater element is fully inserted in a groove, the sleeve usually only contacts the nozzle body. However, where the sleeve contacts the nozzle body and the heater element, the contact with the heater element is still only tangential and inefficient. The tangential contact results in the creation of an insulating dead air space between the sleeve and nozzle body.

Another hot runner nozzle includes a heating element inserted in a spiral groove on a nozzle body and the heating element is vacuum cast in copper. The process for making the nozzle requires the heating element to be inserted in the groove and spot welded. Then, a stainless steel sleeve is placed over the nozzle body and the heating element. A heating element is recessed within the spiral groove so that a space is created within the spiral groove between the outer surface of the heating element and the inner surface of the stainless steel sleeve. A filling reservoir that holds a copper slug is welded to an end of the nozzle so that the reservoir communicates with an opening in the spiral groove. The assembly is then placed in a vacuum furnace, and upon heating, the copper slug melts and the copper flows into the spiral groove filling the space between the heating element and sleeve. The stainless steel sleeve may then be machined off. Where the sleeve is removed, the copper does little to disperse heat along the length of the nozzle body because the copper only contacts the nozzle body within the spiral groove. If the sleeve is left in place, although the copper may improve conduction to the sleeve, the sleeve itself has a low thermal conductivity. In either case, the step of copper casting results in a painstaking and costly process.

Another hot runner nozzle design that has attempted to provide improved heat distribution includes a heating element that is cast in a conductive material, such as brass or beryllium-copper, and slid over a nozzle body. The cast heater has also been combined with a layer of conductive material that is coated on the outer surface of the nozzle. The heating element has to be cast during a separate operation. In addition, once the heater is cast there is less flexibility in changing the length of the casting. In addition, where a coating is utilized, the coating must be applied to the outer surface of the nozzle in a separate process. After those processes are completed, the nozzle would still require assembly. As a result, manufacturing such a hot runner nozzle is costly and time consuming.

Furthermore, thermally conductive coatings have also been utilized on the outer surface of hot runner nozzles and heaters to improve the thermal conductivity. However, coating processes must be properly monitored to assure that the coatings remain consistent and adequate.

There is therefore a need to provide a hot runner nozzle having a generally uniform temperature distribution along the length thereof.

SUMMARY OF THE INVENTION

An embodiment of the present invention is a method of making an injection molding hot runner nozzle that includes providing a nozzle body having a heating element with a tubular thermal shroud preform that covers the nozzle body and the heating element. The method further includes subjecting the nozzle body, heating element and thermal shroud preform subassembly to a pressurized fluid to cause the thermal shroud preform to deform and thereby intimately conform to a profile of the nozzle body and heating element.

Another embodiment of the present invention is directed to an injection molding hot runner nozzle having a nozzle body and a heating element with a pressure-formed thermal shroud thereover. In an embodiment, the thermal shroud may be made of a more thermally conductive material than the nozzle body material. In another embodiment, the thermal shroud includes an inner diameter that varies along its longitudinal length such that the thermal shroud is intimately form fit to the nozzle body and heating element.

In various embodiments according to the present invention, the heating element may be located on an outer surface of the nozzle body or located, either totally or partially, within a heating element groove in an outer surface of the nozzle body.

Other aspects and features of the present invention will become apparent to those of ordinary skill in the art upon review of the following figures and detailed description.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention. The drawings are not to scale.

DETAILED DESCRIPTION OF THE DRAWINGS

Specific embodiments of the present invention are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
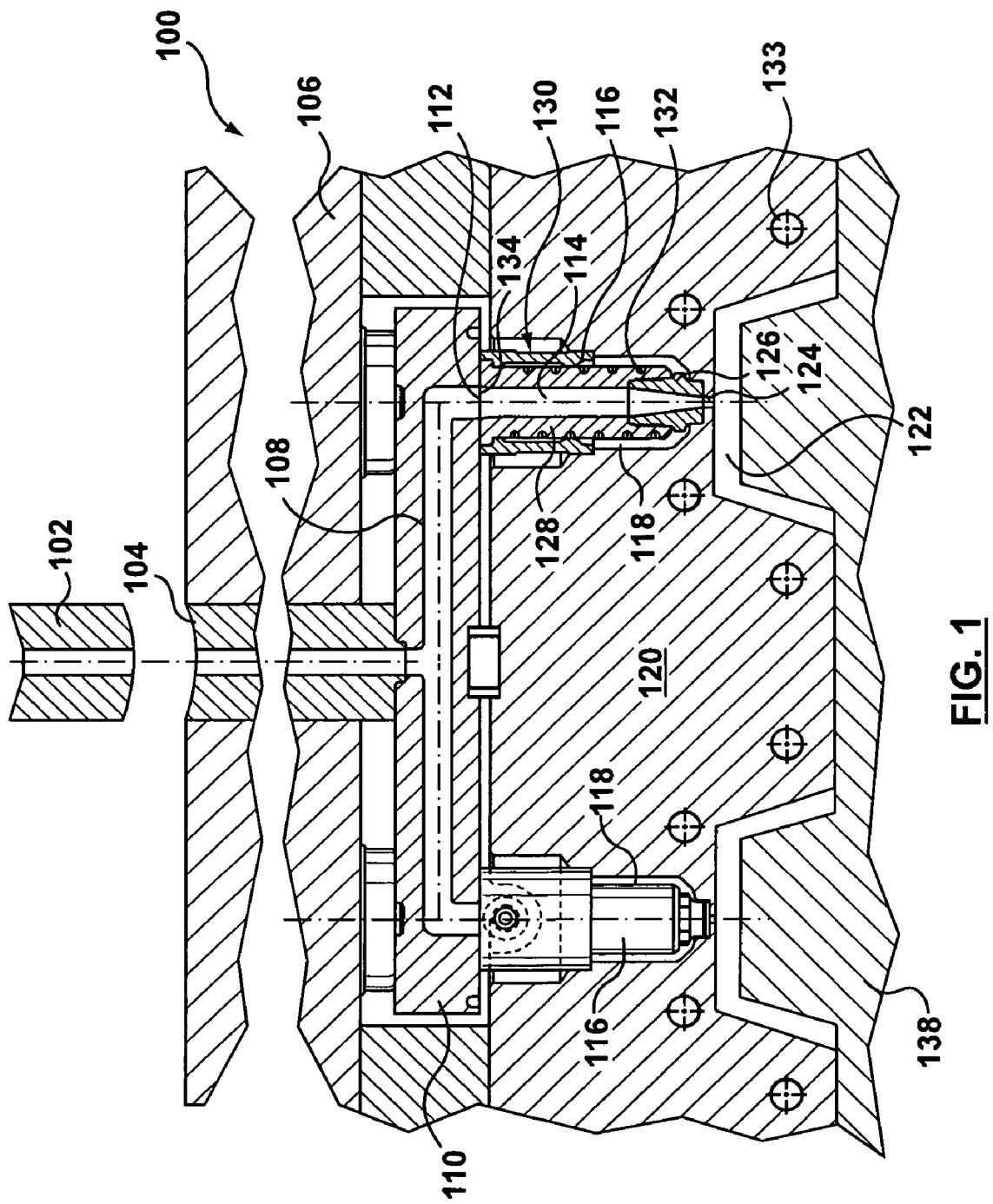
FIG. 1 is a cross-sectional view of an injection molding apparatus.

Referring first to FIG. 1, one example of an injection molding apparatus 100 with which the present invention may be utilized is shown. The injection molding apparatus includes a machine nozzle 102, which introduces a melt stream under pressure into the injection molding system via a sprue bushing 104 that is positioned within a machine platen 106. From sprue bushing 104, melt flows into a manifold melt channel 108 provided in a hot runner manifold 110. In injection molding apparatus 100, manifold 110 allows the melt stream to be distributed through manifold melt channel outlets 134 and into nozzle melt channels 114 provided in respective hot runner nozzles 116. Hot runner nozzles 116 are positioned within nozzle bores, or cavities, 118 of a mold plate 120 and each of hot runner nozzles 116 is aligned with a mold gate 124 by an alignment collar 130. As would be apparent to one of ordinary skill in the art, mold plate 120 may include one or more mold plates, and/or a mold cavity plate. A mold core plate 138 mates with mold plate 120 to form mold cavities 122. Each hot runner nozzle 116 is in fluid communication with a respective mold cavity 122 via mold gate 124 so that the melt stream may be injected through nozzle melt channel 114 and a nozzle tip 126 and into mold cavities 122.

One of hot runner nozzles 116, included in FIG. 1, is shown in cross-section. Hot runner nozzle 116 has a nozzle melt channel inlet 112, at an upper end of nozzle melt channel 114, aligned with outlet 134 of manifold melt channel 108 to receive the melt stream and to deliver the melt through mold gate 124 to mold cavity 122. Hot runner nozzle 116 includes a nozzle body 128, and nozzle tip 126. Injection molding apparatus 100 may include any number of such hot runner nozzles 116 located in respective nozzle bores 118 for transmitting melt from respective nozzle melt channel inlets 112 to respective mold gates 124. Injection molding apparatus 100 utilizes a heating element 132 in each nozzle and cooling channels 133 in the mold to moderate the temperature of the melt. As shown, hot runner nozzle 116 is thermal-gated, however it should be understood that hot runner nozzle 116 may alternatively be valve-gated.

Figure 2:
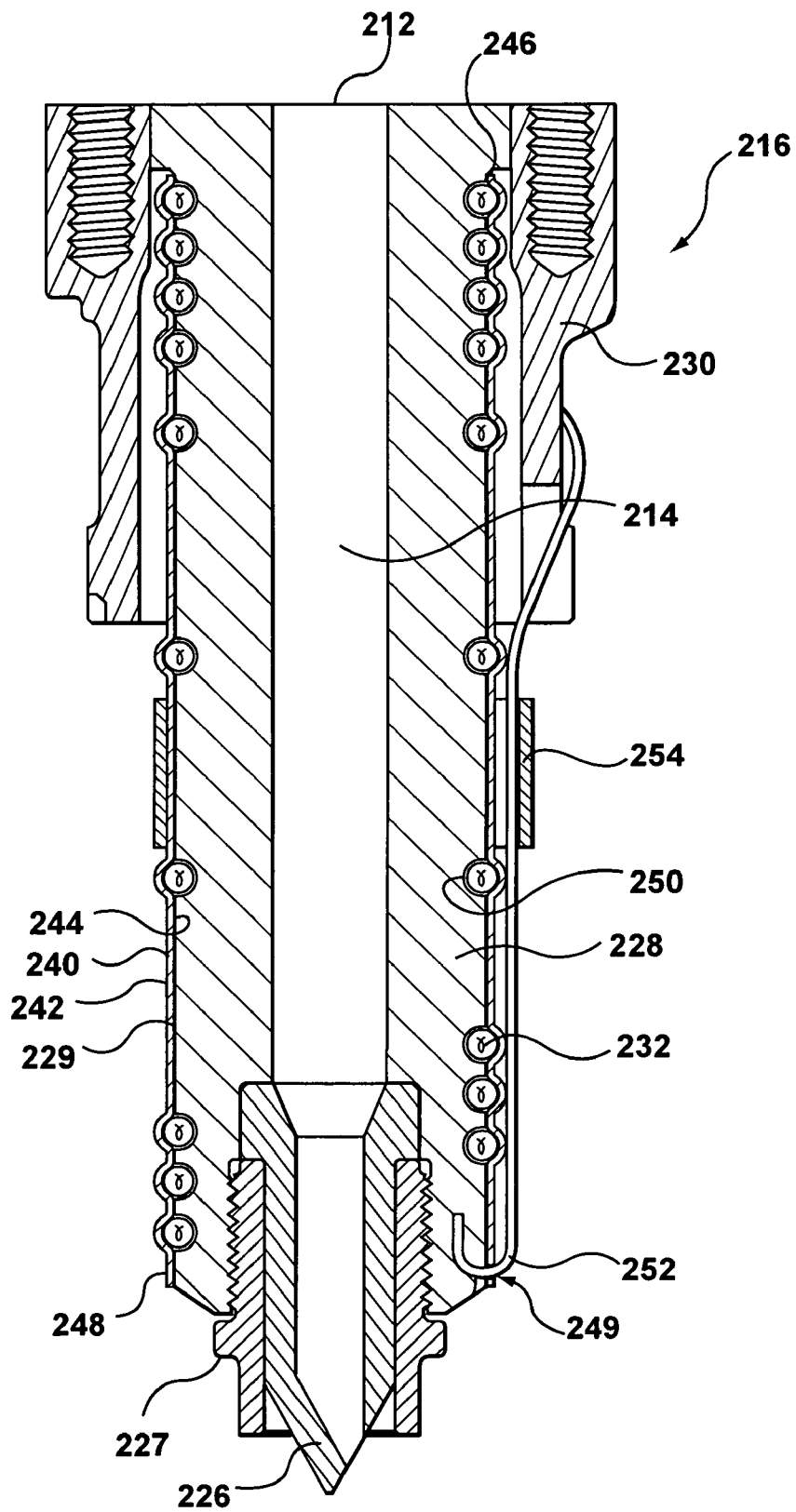
FIG. 2 is a cross-sectional view of an injection molding hot runner nozzle according to an embodiment of the invention.

An injection molding hot runner nozzle 216 according to an embodiment of the present invention is shown in FIG. 2. Hot runner nozzle 216 includes a nozzle melt channel 214, a nozzle body 228, a nozzle tip 226, a tip retainer 227, a heating element 232, an alignment collar 230 and a thermal shroud 240. Nozzle melt channel 214 extends longitudinally through nozzle body 228 from a nozzle melt channel inlet 212 to nozzle tip 226. Nozzle tip 226 is held within nozzle body 228 by tip retainer 227 which threadably engages nozzle body 228.

Heating element 232 is received within a helical groove 250 that is located in an outer surface 229 of nozzle body 228. In the present embodiment, heating element 232 and helical groove 250 are sized such that a portion of heating element 232 extends laterally outward beyond outer surface 229 of nozzle body 228. Heating element 232 is a resistance wire covered with a dielectric material, but it shall be appreciated that any heating element known in the art may be employed. Heating element 232 may be secured within helical groove 250 by a press fit, burring of portions of helical groove 250 or through bonding techniques such as brazing, spot welding, or any other securing method known to persons skilled in the art.

A thermocouple 252 extends longitudinally along an outer surface 242 of thermal shroud 240 and terminates in nozzle body 228 near nozzle tip 226 and tip retainer 227. A thermocouple hole 249 is provided in thermal shroud 240 so that thermocouple 252 can pass therethrough. Thermocouple 252 is held in place along nozzle body 228 by a thermocouple clip 254. Although a thermocouple is used, any temperature sensor known in the art may be employed. Thermocouple 252 and heating element 232 are connected to a control system (not shown) that monitors the temperature of nozzle body 228 and provides power to heating element 232 as necessary to maintain a desired temperature.

Thermal shroud 240 is coupled to outer surface 229 of nozzle body 228 and heating element 232 such that it intimately contacts both. Thermal shroud 240 is generally tubular with a substantially constant wall thickness. Thermal shroud 240 has a first end 246 and a second end 248 that are located adjacent to alignment collar 230 and nozzle tip 226, respectively. Thermal shroud 240 also includes an inner surface 244 and outer surface 242 that extend between first end 246 and second end 248 to form the tubular shroud 240. The inner and outer diameters of thermal shroud 240 vary along the length of thermal shroud 240 and generally match the contour, or profile, of the combined nozzle body 228 and heating element 232. However, in accordance with another embodiment of the present invention, thermal shroud 240 may be of a great enough thickness to have an outer surface thereof machined to a constant outer diameter without exposing heating element 232. Thermal shroud 240 is intimately fit or coupled to nozzle body 228 such that the contact area between inner surface 244 and the combined nozzle body 228 and heating element 232 is equal to substantially all of the exposed surface area of nozzle body 228 and heating element 232.

The intimate form fit of thermal shroud 240 improves the efficiency of the heat transfer over conventional thermal sleeves. Conventional thermal sleeves generally only contact the heating element tangentially or the nozzle body over small portions resulting in only a small contact area between the components. The intimate form fit of thermal shroud 240 increases the contact area by contacting substantially all of the available surface area of both the nozzle body 228 and heating element 232 simultaneously. Since thermal conduction between two surfaces is directly related to the contact area, the increased contact area between thermal shroud 240, nozzle body 228 and heating element 232 improves the efficiency of conductive heat transfer between the components over conventional thermal sleeves. In addition, during thermal expansion of thermal shroud 240, due to the form fit of thermal shroud 240 portions of thermal shroud 240 may expand toward portions of nozzle body 228 and/or heating element 232 further improving the contact and heat conduction therebetween.

Thermal shroud 240 is constructed from a thermal shroud preform, similar to thermal shroud preform 541 shown and described with reference to FIG. 5 below. The thermal shroud preform is a tube that has been manufactured to desired dimensions. The thermal shroud preform may be drawn tubing that has been manufactured using a die designed to create the final preform inner and outer diameters such that no additional operations, other than cutting for a specific length, are required. The thermal shroud preform may also be a tube that has been machined with desired preform inner and outer diameters.

The inner diameter and wall thickness of a preform depends on the particular nozzle body and heating element being used. The inner diameter of the thermal shroud preform is generally sized to be approximately 0.02-0.2 mm larger than the outer diameter of the combined nozzle body 228 and heating element 232 to allow for a slide fit. The inner diameter may be in the range of 17-36 mm and the wall thickness may be in the range of 0.25-0.6 mm. It shall be appreciated that the inner diameter and wall thickness need not be within the given ranges and the ranges are given for example only. It shall also be appreciated that the inner diameter of the thermal shroud may be configured to require that the preform be thermally fit over the nozzle body and heating element. After machining the inner and outer diameters, an end of the tubing is chamfered to create the final thermal shroud preform. The chamfered edge is provided to facilitate assembly of the preform over the combined nozzle body 228 and heating element 232. The chamfered edge corresponds to first end 246 of thermal shroud 240. In an embodiment, the preform is nickel plated to provide corrosion resistance. Such nickel plating may be included on any or all surfaces and/or through holes of the preform. The plating may have a thickness, for example, in the range of 0.05 mm to 0.3 mm. After nozzle body 228, heating element 232 and the preform are assembled, the assembly is placed in a pressure-forming apparatus, such as the apparatus described below with reference to FIG. 4, and a pressure-forming process is performed, as described below with reference to FIGS. 5-10. It should also be appreciated that an insulative ceramic coating may be applied to thermal shroud 240 after the pressure-forming process has been completed.

Thermal shroud 240 is made from a malleable material that has a higher thermal conductivity than nozzle body 228. For example, nozzle body 228 may be constructed from a steel, such as SS420, P20 or H13 generally having a thermal conductivity in the range of 20-35 W/m-K, and thermal shroud 240 may be constructed from copper or a copper alloy generally having a thermal conductivity in the range of 100-390 W/m-K. Thermal shroud 240 may alternatively be constructed from aluminum or an aluminum alloy which generally have a thermal conductivity in the range of 100-220 W/m-K or any other material recognized by a person having ordinary skill in the relevant art. The material is chosen so that for a thermal shroud preform with given dimensions, it is malleable enough that the pressure required for pressure-forming the thermal shroud will not damage the nozzle body or heating element.

Figure 3A:
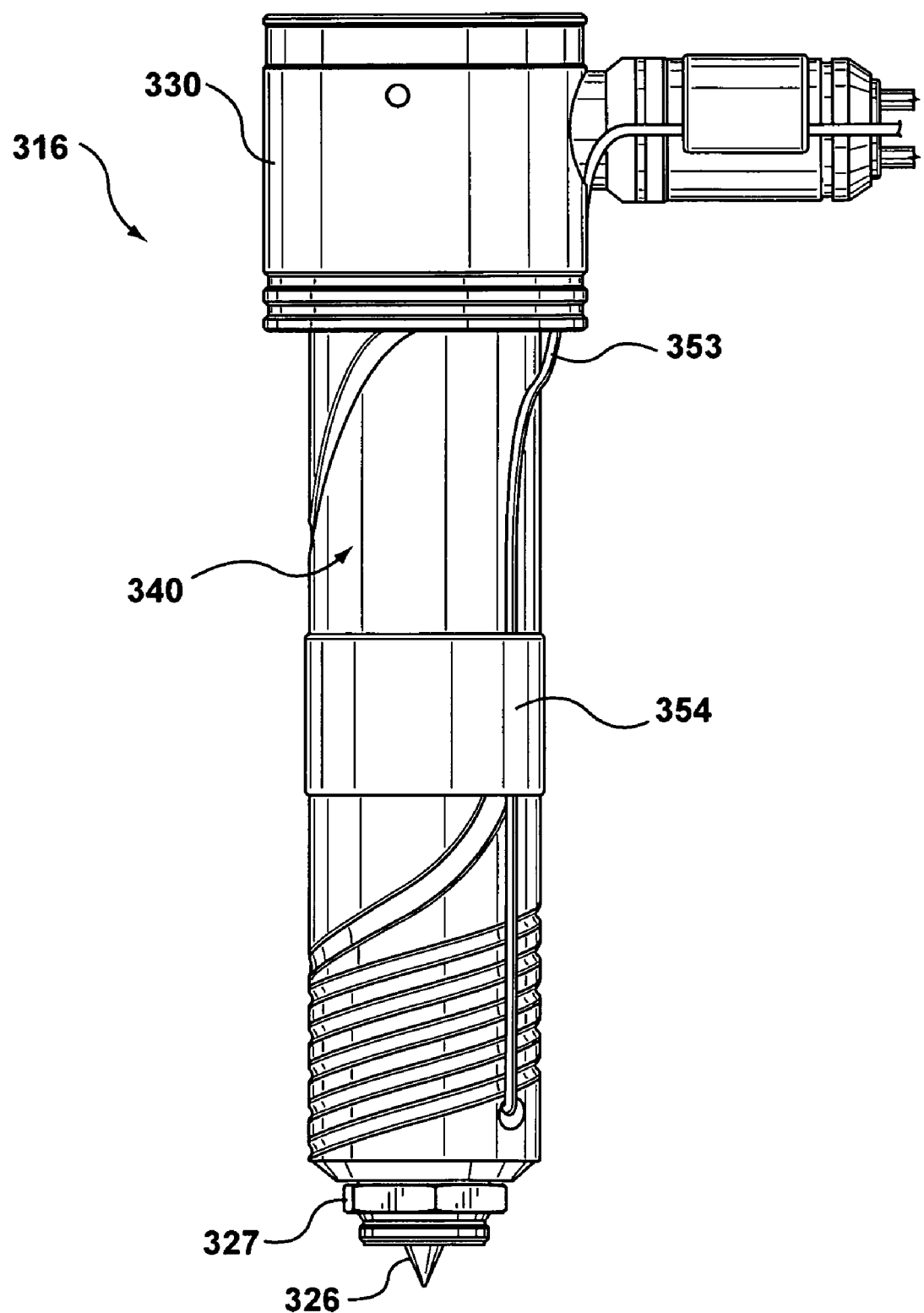
FIG. 3A is a side view of an injection molding hot runner nozzle according to another embodiment of the invention.
Figure 3B:
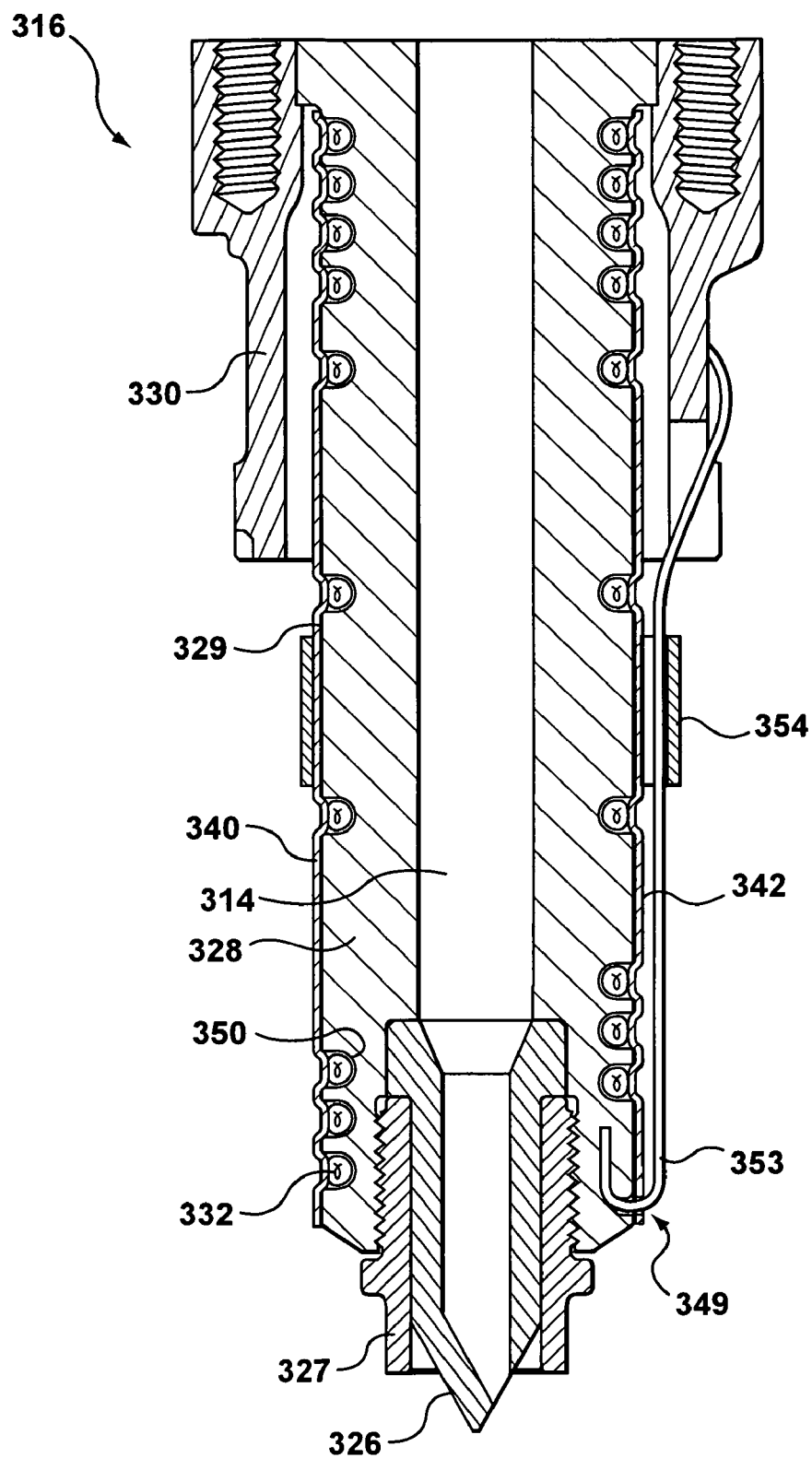
FIG. 3B is a cross-sectional view of the injection molding hot runner nozzle shown in FIG. 3A.

Another embodiment of the present invention, hot runner nozzle 316, is shown in FIGS. 3A and 3B. Similar to hot runner nozzle 216 described above, hot runner nozzle 316 includes a nozzle melt channel 314, a nozzle body 328, a nozzle tip 326, a tip retainer 327, a heating element 332, an alignment collar 330 and a thermal shroud 340. Hot runner nozzle 316 also includes a thermocouple 353, which passes through a thermocouple hole 349 provided in thermal shroud 340, extends longitudinally along an outer surface 342 of thermal shroud 340 and is held in place by thermocouple clip 354. Heating element 332 of hot runner nozzle 316 is located entirely within a helical groove 350. Heating element 332 does not radially extend out of helical groove 350, as does heating element 232 of hot runner nozzle 216 previously shown in FIG. 2. As a result, when nozzle body 328 and heating element 332 are combined there is a helical indentation along an outer surface 329 of nozzle body 328. Thermal shroud 340 is configured to enter the helical indentation and contact the exposed surface area of heating element 332 in addition to the exposed surface area of helical groove 350 and outer surface 329 of nozzle body 328. In accordance with another embodiment of the present invention, thermal shroud 340 may be of a great enough thickness to have an outer surface thereof machined to a constant outer diameter without exposing outer surface 329 of nozzle body 328. In such an embodiment, an inner diameter of thermal shroud 340 would still vary along its length to conform to a profile of heating element 332 and nozzle body 328. The form fit of thermal shroud 340 with nozzle body 328 and heating element 332 improves conduction by increasing the contact area and maintaining the contact during thermal expansion. Thermal shroud 340 is constructed in the same manner as thermal shroud 240 shown in FIG. 2 and described above.

Figure 11:
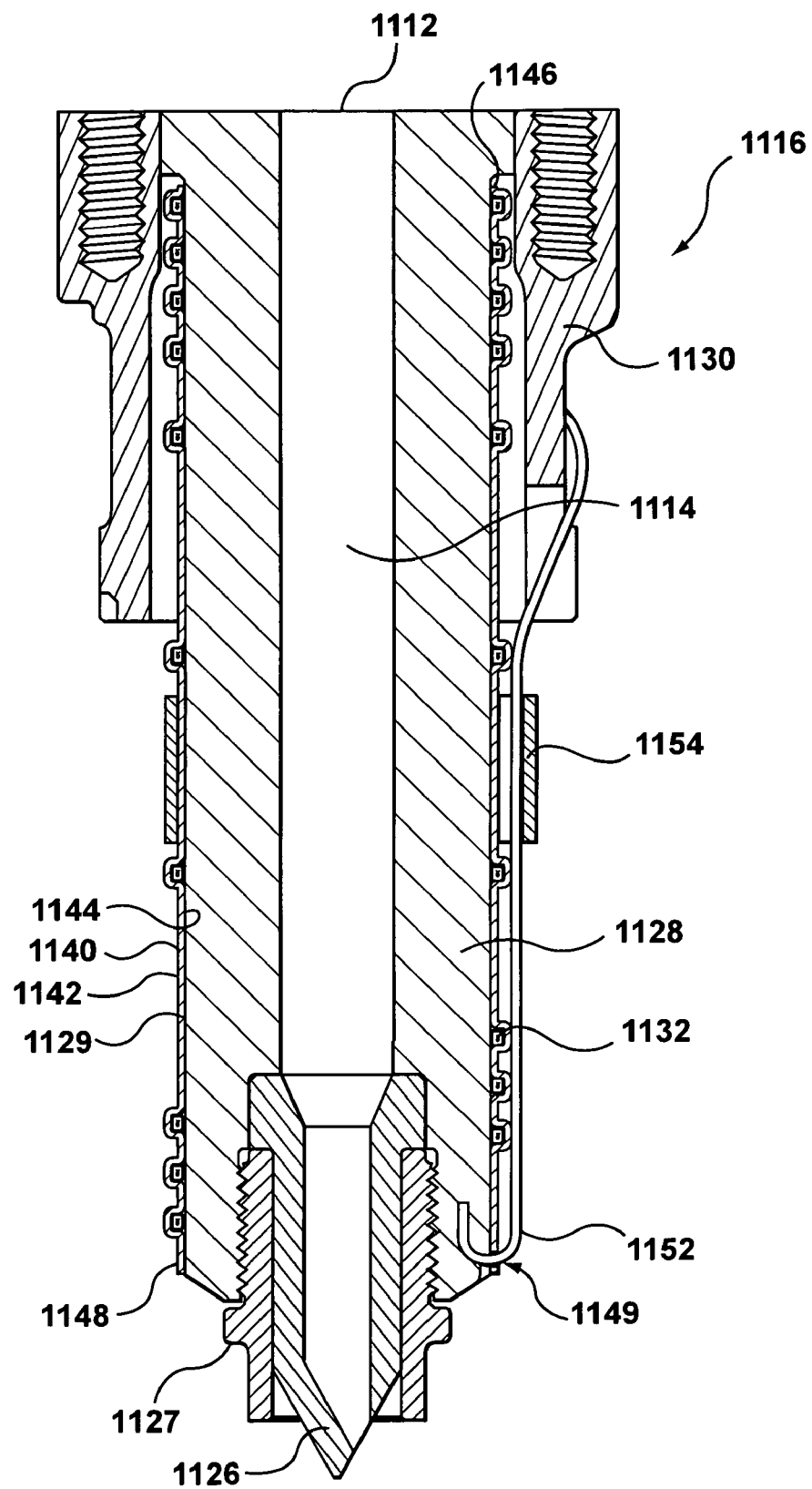
FIG. 11 is a cross-sectional view of an injection molding hot runner nozzle according to another embodiment of the present invention.

Another embodiment of the present invention, hot runner nozzle 1116, is shown in FIG. 11. Similar to the other embodiments described above, hot runner nozzle 1116 includes a nozzle melt channel 1114 having a nozzle inlet 1112, a nozzle body 1128, a nozzle tip 1126, a tip retainer 1127, a heating element 1132, an alignment collar 1130 and a thermal shroud 1140 having a first end 1146 and a second end 1148. Hot runner nozzle 1116 also includes a thermocouple 1152, which passes through a thermocouple hole 1149 provided in thermal shroud 1140, extends longitudinally along an outer surface 1142 of thermal shroud 1140 and is held in place by thermocouple clip 1154. Unlike the previously described nozzles, there is no helical groove and heating element 1132 of hot runner nozzle 1116 is located on an outer surface 1129 of nozzle body 1128. Thermal shroud 1140 is configured to enter the indentation created by the gap between windings of thermal element 1132 and outer surface 1129 of nozzle body 1128 so that an inner surface 1144 contacts the exposed surface area of heating element 1132 in addition to the exposed surface area of outer surface 1129. The form fit of thermal shroud 1140 with nozzle body 1128 and heating element 1132 improves conduction by increasing the contact area and maintaining the contact during thermal expansion. As shown, heating element 1132 has a rectangular cross-section that improves contact with the nozzle body, however it shall be appreciated that a heater having any cross-sectional shape may be used. Thermal shroud 1140 is constructed in the same manner as thermal shrouds 240 and 340 described above.

In addition to the thermal function, thermal shrouds 240, 340 and 1140 may also provide a clamping function that locates the respective heating element in tight and intimate contact with the respective nozzle body in both cold (i.e., room temperature) and hot conditions (i.e., operating temperature). Unlike the known hot runner nozzles that have a conductive sleeve over the heating element, the thermal shroud further clamps the respective heating element to the nozzle body while minimizing any air pockets between the heater and the thermal shroud. In addition, in embodiments where the thermal shroud extends into a recess, thermal expansion of the thermal shroud within the recess may further maintain intimate contact between the thermal shroud and the outer surface of the nozzle body.

Figure 4:
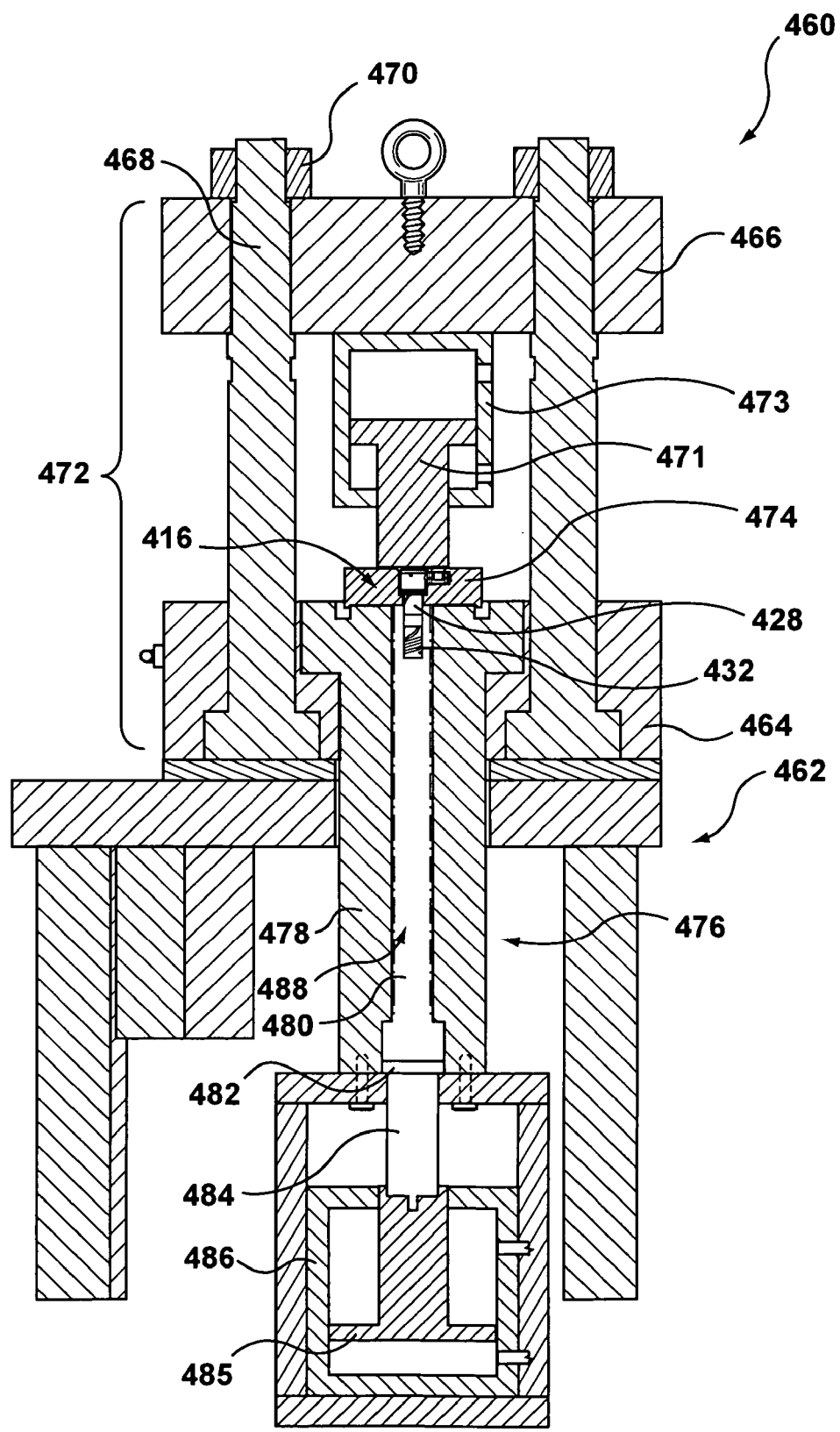
FIG. 4 is a cross-sectional view of an apparatus for forming a nozzle according to the present invention.

The intimate form fit illustrated by thermal shrouds 240 and 340 may be accomplished by employing the pressure-forming apparatus shown in FIG. 4 and the method illustrated by FIGS. 5-10. Pressure-forming apparatus 460 is a mechanism that allows a thermal shroud to be formed, contoured and secured over a nozzle body 428 and a heating element 432 by applying fluid pressure to an outer surface of a thermal shroud preform to create hot runner nozzle 416. Pressure-forming apparatus 460 is constructed on a base 462 and includes a press 472 that includes a lower platen 464, an upper platen 466, a piston 471, a cylinder body 473, a nozzle holding fixture 474 and a pressure vessel assembly 476. Lower platen 464 is mounted to base 462 and pressure vessel assembly 476 is mounted to lower platen 464 and extends downward through lower platen 464 and a portion of base 462. Nozzle holding fixture 474 holds hot runner nozzle 416 such that nozzle body 428 extends into a pressure vessel cavity 480 that extends into a pressure vessel 478. Piston 471 and cylinder body 473 are located between nozzle holding fixture 474 and upper platen 466. Upper platen 466 and lower platen 464 are coupled by a plurality of tie bars 468 and associated tie bar nuts 470.

Piston 471 and cylinder body 473 are configured to place pressure upon nozzle holding fixture 474. Piston 471 is movable with respect to cylinder body 473 by hydraulic pressure. In an embodiment, piston 471 is moved toward hot runner nozzle 416 by oil pressure and retracted away from hot runner nozzle 416 by air pressure. Although a piston and cylinder body press assembly is shown, it should be appreciated that any linear press known in the art may be used.

Pressure vessel assembly 476 includes pressure vessel 478, a pressure vessel piston 482, a pressure coupling 484 and a hydraulic cylinder 486. Pressure vessel 478 includes pressure vessel cavity 480 that holds a fluid 488, which may be any liquid or gas and may include additives. For example, fluid 488 may be deionized water with rust inhibitors. Pressure vessel 478 is open on the top end to expose pressure vessel cavity 480, so that nozzle body 428 can be received therein. Pressure vessel piston 482 is located within a lower portion of pressure vessel cavity 480 and is slidable therein. Pressure vessel piston 482 is coupled to hydraulic cylinder 486 by pressure coupling 484. Hydraulic cylinder 486 is a linear actuator that moves pressure vessel piston 482 within pressure vessel cavity 480.

Piston 471 and cylinder body 473 and pressure vessel piston 482 may be any commercially available piston assembly that is known by a person having ordinary skill in the art. For example such piston assemblies are commercially available from Enerpac of Milwaukee, Wis.

Nozzle holding fixture 474 is configured to hold nozzle body 428 within pressure vessel cavity 480. When nozzle body 428 is positioned in nozzle holding fixture 474 and nozzle holding fixture 474 is located on pressure vessel 478, it seals the open of pressure vessel cavity 480. After pressure vessel cavity 480 is sealed, movement of pressure vessel piston 482 within pressure vessel cavity 480 causes the fluid pressure within pressure vessel cavity 480 to change which allows the following pressure-forming method to be performed. Piston 471 places pressure upon nozzle holding fixture 474 so that it is not forced off of pressure vessel 478 when the pressure of fluid 488 is increased.

Figure 5:
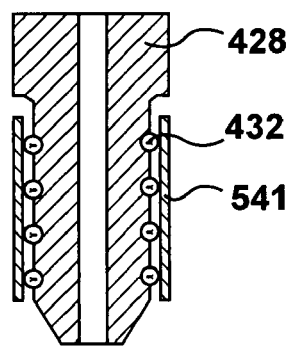
FIGS. 5 to 10 illustrate steps of a method for making a nozzle according to the present invention.

A method of using pressure-forming apparatus 460 is illustrated in FIGS. 5-10. FIG. 5 shows the first step of the process where nozzle body 428 and heating element 432 are coupled and a thermal shroud preform 541 is positioned over nozzle body 428 and heating element 432. The configuration shown in FIG. 5 generally corresponds to the configuration of conventional thermal sleeves where the inefficient conduction is provided between the components.

Figure 6:
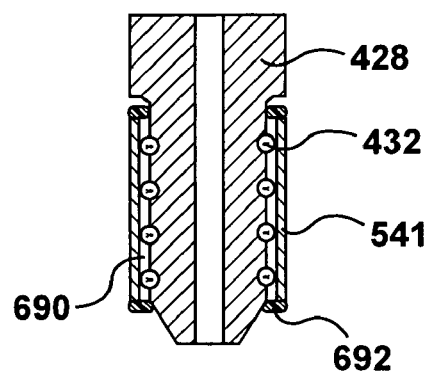

In the next step, shown in FIG. 6, a space 690 between thermal shroud preform 541 and the combined nozzle body 428 and heating element 432 is sealed on either end with sealant 692. Sealant 692 is allowed to cure. The cured sealant 692 prevents ingress of fluid into space 690. Sealant 692 may be applied to nozzle body 428 and preform 541 by dipping the combined nozzle body 428, heating element 432 and preform 541 into a heated wax-like substance or a liquid material that may be cured. For example, the combined components may be dipped into a low melt temperature thermoplastic elastomer which is allowed to solidify prior to insertion into pressure-forming apparatus 460.

Figure 7:
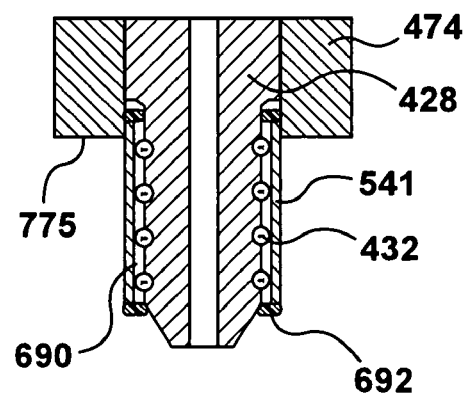

The sealed thermal shroud preform 541, nozzle body 428 and heating element 432 are then installed into nozzle holding fixture 474, as shown in FIG. 7. Nozzle holding fixture 474 holds a head portion of nozzle body 428 so that the remainder of nozzle body 428 and thermal shroud preform 541 extend below a bottom surface 775 of nozzle holding fixture 474.

Figure 8:
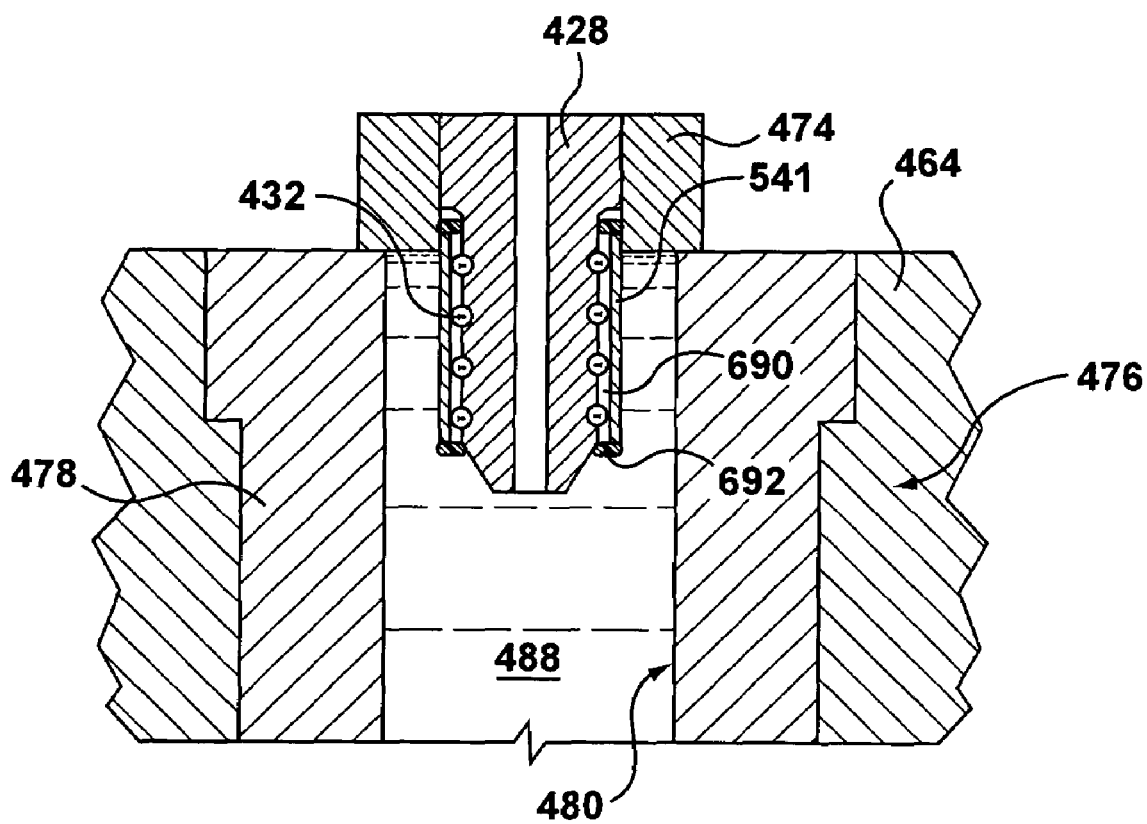

FIG. 8 shows nozzle holding fixture 474 installed on pressure vessel 478 of pressure vessel assembly 476 that is held by lower platen 464. As shown, nozzle holding fixture 474 holds nozzle body 428 such that thermal shroud preform 541 extends into pressure vessel cavity 480 that is filled with fluid 488, which is water in the present embodiment.

Figure 9:
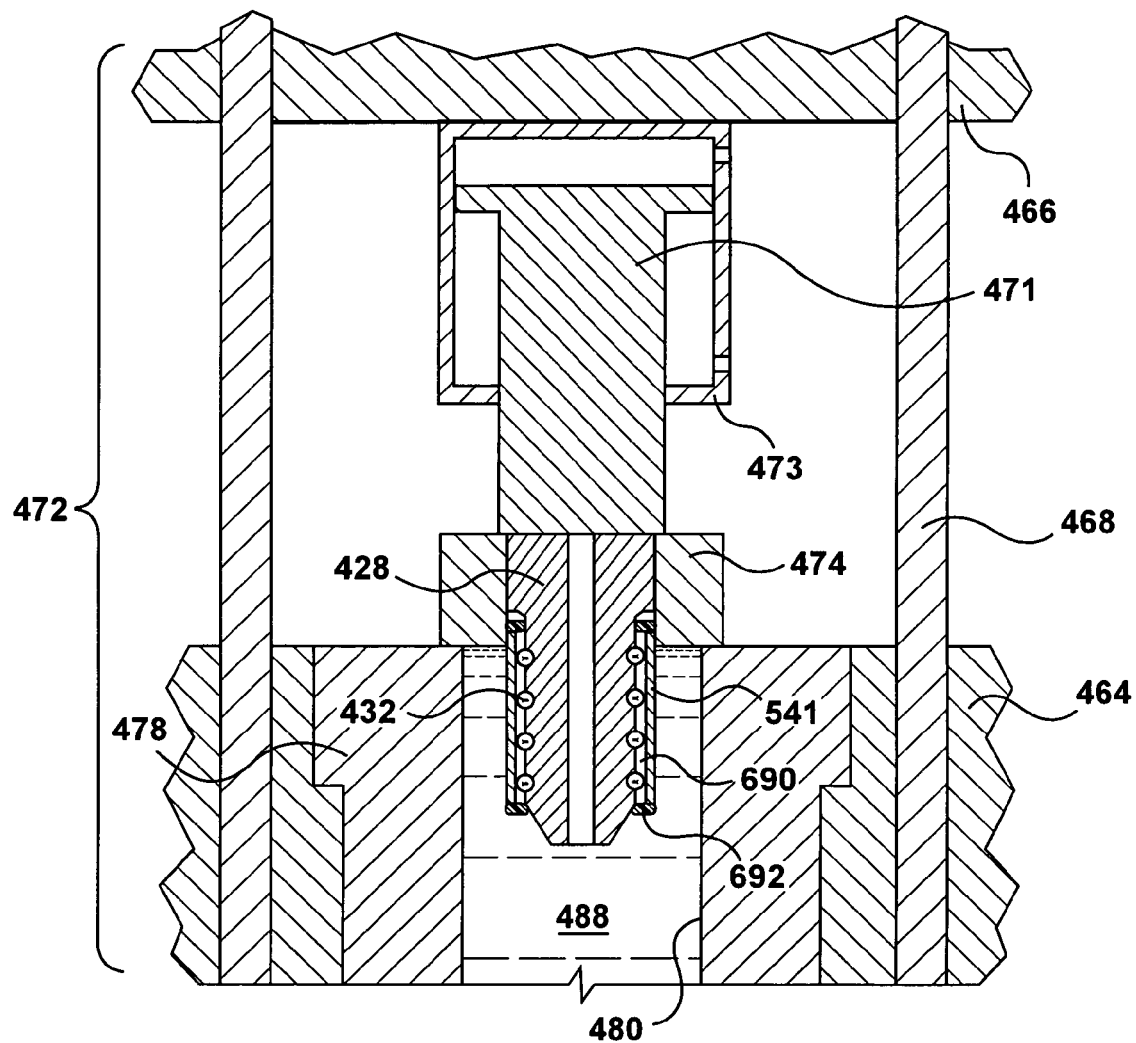

Next, upper platen 466, piston 471 and cylinder body 473 are positioned over nozzle holding fixture 474, as shown in FIG. 9. Upper platen 466 and lower platen 464 are coupled with tie bars 468 to hold piston 471, cylinder body 473, nozzle holding fixture 474 and pressure vessel 478 therebetween. The tonnage of press 472 is selected so that it is proportional to the projected area of pressure vessel 478.

Figure 10:
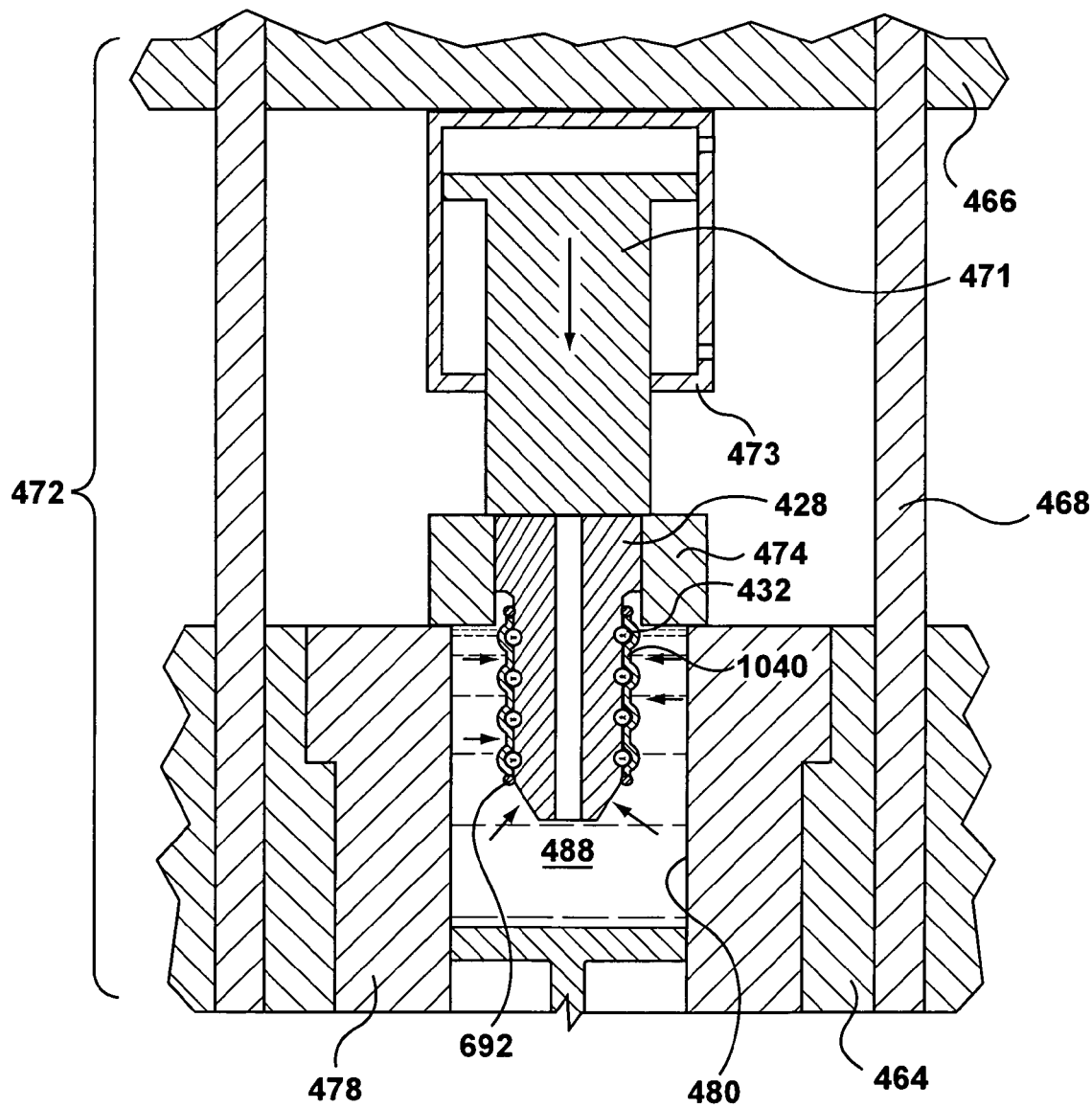

Pressure is then applied to nozzle holding fixture 474 by press 472 while pressure of fluid 488 is increased, as shown in FIG. 10. As the pressure of fluid 488 is increased, it causes the thermal shroud preform 541 to convert into thermal shroud 1040 by intimately form fitting the preform to the combined nozzle body 428 and heating element 432. In an embodiment, a thermal shroud preform 541 having a wall thickness of 0.75 mm requires approximately 28,000-55,000 psi to form fit into thermal shroud 1040. After sufficient pressure is applied to convert thermal shroud preform 541 into thermal shroud 1040, the pressure of fluid 488 and the pressure applied by press 472 are reduced.

The final step requires the removal of upper platen 466, piston 471 and cylinder body 473 from nozzle holding fixture 474. After upper platen 466, piston 471 and cylinder body 473 are removed, nozzle body 428, heating element 432 and thermal shroud 1040 are then removed and seals 692 may be removed. In a method according to another embodiment of the present invention, thermal shroud 1040 may then be machined to have a constant outer diameter.

It should be appreciated that the process may be modified such that the nozzle is not exposed to the fluid in the pressure vessel. For example, a flexible sock may be placed between the nozzle and the fluid. As another alternative, a toroidal or donut shaped diaphragm may be placed around the thermal shroud preform such that inflation of the diaphragm with pressurized fluid subjects the thermal shroud preform to fluid pressure.

It should be appreciated that the combined nozzle body and heating element may have a variety of configurations. For example, heating element may extend laterally outward beyond the outer surface of the nozzle body, heating element may be recessed below the outer surface of the nozzle body or heating element may be flush with the outer surface of the nozzle body. Where the heating element is flush with the outer surface, interstices will still be present in between the heating element and the helical groove and the thermal shroud will be pressure-formed to fill those interstices, similar to thermal shroud 340 shown in FIG. 3.

It should further be appreciated that thermal shrouds may be pressure-formed on multiple nozzles simultaneously. Such simultaneous forming may be performed with a nozzle holding fixture that is designed to hold multiple nozzle bodies and a pressure-forming apparatus that has an increased capacity.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of making an injection molding hot runner nozzle, comprising:
   providing a nozzle body having a heating element disposed on an outer surface of said nozzle body;
   disposing a tubular thermal shroud preform over said nozzle body and said heating element to form a subassembly; and
   subjecting said subassembly to pressurized fluid to cause said thermal shroud preform to deform such that it intimately conforms to a profile of said nozzle body and said heating element to become a thermal shroud wherein the thermal shroud has inner and outer diameters that vary along the length of the thermal shroud to generally match the profile of the nozzle body and the heating element there under.

2. The method of claim 1, wherein the pressurized fluid is provided by moving a pressure vessel piston within a pressure vessel.

3. The method of claim 1, wherein said fluid is water.

4. The method of claim 1, wherein said thermal shroud preform is constructed from a material selected from a group consisting of copper, a copper alloy, aluminum and an aluminum alloy.

5. The method of claim 1, wherein said thermal shroud preform is copper with a wall thickness of 0.75 mm.

6. The method of claim 1, wherein the nozzle body includes a groove on said outer surface and said heating element is disposed at least partially within said groove.

7. The method of claim 6, wherein the heating element is fully disposed within the nozzle body groove whereby an inner surface of the thermal shroud makes contact with the heating element within the groove below the outer surface of the nozzle body.

8. The method of claim 1, wherein said thermal shroud clamps said heating element to said nozzle body.

9. The method of claim 1 further comprising:
   machining an outer surface of said thermal shroud to a constant outer diameter.

10. The method of claim 1, wherein the thermal shroud preform is made of a malleable material deformable at a fluid pressure that will not damage the nozzle body or the heating element.

11. The method of claim 1, further comprising:
    sealing opposing ends of the tubular thermal shroud preform to the nozzle body and the heating element combination prior to subjecting the subassembly to pressurized fluid.

12. A method of making an injection nozzle comprising:
    providing a nozzle having a nozzle body with a groove in an outer surface thereof;
    providing a heater element that is fully disposed within the nozzle body groove;
    locating a tubular shroud preform over said heater element and said nozzle body to form a nozzle subassembly;
    placing said nozzle subassembly into a pressure vessel; and
    applying a fluid pressure to said nozzle subassembly in order to deform and contour said tubular shroud preform over said nozzle body and said heater element to thereby form a thermal shroud having an intimate form fit over said nozzle body and said heating element whereby an inner surface of the thermal shroud makes contact with the heating element within the groove below the outer surface of the nozzle body and an outer diameter of the thermal shroud varies along the length of the thermal shroud.

13. The method of claim 12, wherein the thermal shroud clamps said heating element to said nozzle body.

14. The method of claim 12 further comprising:
    machining an outer surface of said thermal shroud to a constant outer diameter.

* * * * *